Patented June 22, 1954

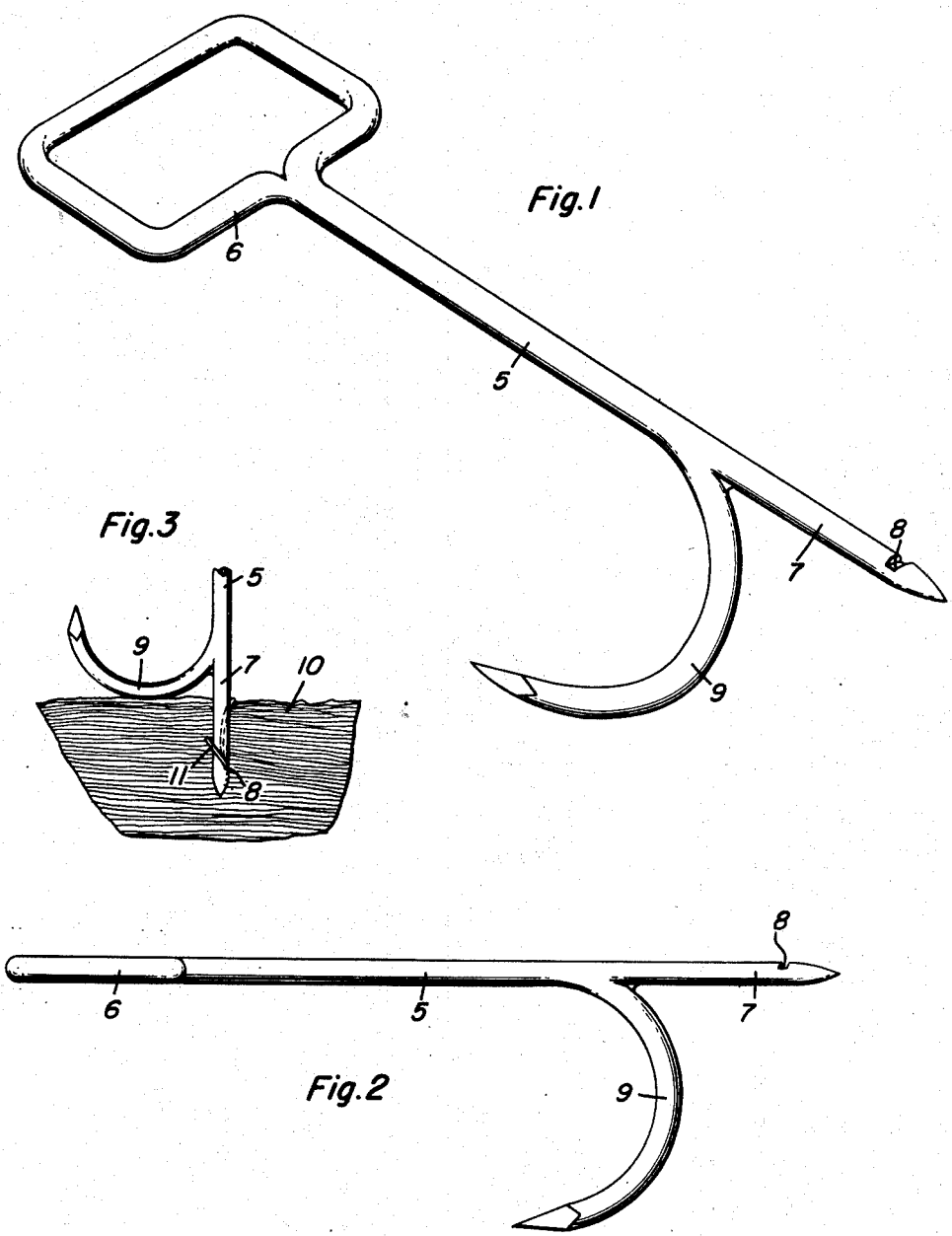

2,681,756

UNITED STATES PATENT OFFICE 2,681,756

BALE TIE FASTENING NEEDLE

Frank Warmbrodt, Boonville, Mo.

Application December 4, 1950, Serial No. 198,985

2 Claims. (Cl. 223—104)

The present invention relates to new and useful improvements in needles for fastening or embedding the loose ends of twine bale ties in round or cylindrical rolls of baled hay, straw or other forage to anchor the tie and prevent unraveling thereof and the unrolling of the bale.

In the formation of rolled or round bales of hay a twine bale tie is employed which is spirally rolled about the hay and leaving a free end which must be tied or suitably secured to hold the hay in its rolled form. Accordingly, it is an object of the present invention to provide an easily manipulated tool for this purpose.

An important object of the invention is to provide a bale tying needle formed on a bale hook of a type usually employed in handling bales of hay, whereby to provide a double purpose tool.

Another object is to provide a tool of this character of simple and practical construction, which is efficient and dependable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a side elevational view; and,

Figure 3 is a fragmentary side elevational view on a reduced scale and showing the needle in position for anchoring the twine in the bale.

Referring now to the drawing in detail, wherein for the purpose of illustration I have disclosed a preferred embodiment of my invention, the numeral 5 designates a metal rod forming a shank and with a rectangular shaped handle 6 at its rear end and with a pointed front end forming a needle 7. The needle is formed with a notch or transverse diagonally inclined groove 8 immediately rearwardly of its pointed end.

A pointed bale hook 9 is curved laterally from one side of shank 5 at the rear end of needle 7, the hook being cast with the shank or may be welded or otherwise suitably secured thereto, or the needle may be welded or otherwise suitably secured to the front end of a conventional type of bale hook co-axially with the shank.

The needle projects forwardly beyond the foremost portion of the hook, whereby the hook forms a stop to limit penetrating movement of the needle into a bale of hay 10.

In the operation of the tool, the loose end of a bale tying twine 11 is placed in notch 8 and the needle forced into the bale of hay to embed the tie therein and as the needle is withdrawn the loose end of the tie remains embedded to thus anchor the tie in the bale.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A bale tool comprising an elongated shank having a handle at its rear end and a needle at the front end thereof, said shank having a transverse diagonally extending groove adjacent the pointed end of the needle for receiving a bale tying twine to anchor the same in a bale when penetrated by the needle, and a bale hook projecting laterally from the shank intermediate the ends thereof for limiting the penetration of the needle and for positioning the bale prior to anchoring the twine.

2. A bale tool comprising an elongated shank, a handle on the upper end of said shank, the lower end of said shank being pointed, a stop projecting radially outwardly from the shank adjacent the pointed end of the shank for limiting penetration of the pointed end, the lower end portion of said shank between the pointed end and the stop having a transverse groove therein inclined to the longitudinal axis of the shank, said groove being provided on the wall of the shank diametrically opposite the stop.

References Cited in the file of this patent

UNITED STATES PATENTS

| Number | Name | Date |
|---|---|---|
| 580,316 | Hummel | Apr. 6, 1897 |
| 601,123 | Chase | Mar. 22, 1898 |
| 640,853 | Arnold | Jan. 9, 1900 |
| 683,655 | Mersch | Oct. 1, 1901 |
| 877,619 | Vasey | Jan. 28, 1908 |
| 1,087,026 | Maisel | Feb. 10, 1914 |